United States Patent [19]  
Daouse et al.

[11] Patent Number: 4,913,645  
[45] Date of Patent: Apr. 3, 1990

[54] EXTRUSION APPARATUS

[75] Inventors: Alain Daouse, Noailles; Alain Gueroult, Goincourt, both of France

[73] Assignee: Nestec S.A., Vevey, Switzerland

[21] Appl. No.: 12,867

[22] Filed: Feb. 10, 1987

[30] Foreign Application Priority Data

Feb. 27, 1986 [EP] European Pat. Off. ........ 86102567.4

[51] Int. Cl.⁴ ............................................. A21C 11/16
[52] U.S. Cl. .................................... 425/150; 118/323; 425/375; 425/377
[58] Field of Search ................ 118/323; 425/150, 375, 425/377; 364/168

[56] References Cited

U.S. PATENT DOCUMENTS

| | | | |
|---|---|---|---|
| 1,903,570 | 4/1933 | Kremmling | 425/375 |
| 2,320,496 | 6/1943 | Wechsler | 421/461 |
| 2,742,000 | 4/1956 | Hansen et al. | 425/375 |
| 3,119,150 | 1/1964 | Hungerford | 425/377 |
| 3,312,562 | 4/1967 | Miller | 118/323 |
| 3,386,414 | 6/1968 | Faber | 118/323 |
| 3,621,522 | 11/1971 | Woodall | 425/375 |
| 3,677,681 | 7/1972 | Zippel et al. | 425/145 |
| 3,802,386 | 4/1974 | Wendlant et al. | 118/323 |
| 3,809,516 | 5/1974 | Komaki | 425/375 |
| 3,940,226 | 2/1976 | Verhoeven | 425/375 |
| 4,075,301 | 2/1978 | Oswald | 425/375 |
| 4,478,568 | 10/1984 | Folli et al. | 425/375 |
| 4,504,511 | 3/1985 | Binley | 425/319 |
| 4,536,147 | 8/1985 | Groff | 425/377 |
| 4,657,501 | 4/1987 | Klacik et al. | 425/377 |
| 4,749,347 | 6/1988 | Valavaara | 425/375 |

Primary Examiner—Willard Hoag  
Attorney, Agent, or Firm—Vogt & O'Donnell

[57] ABSTRACT

To make decorated strands of pasty products, a pasty material is continuously extruded from a nozzle integral with a mobile support disposed above a continuously moving conveyor belt. The apparatus thus includes a conveyor belt adapted for continuous movement, a mobile support disposed above the conveyor belt, at least one extrusion nozzle integral with the mobile support, at least one source for providing a continuous supply of pasty product to each nozzle and means adjacent an edge of the conveyor for transmitting movement to the support for moving it in one plane while keeping it in the same orientation in space for providing a repetitive curved trajectory for each extrusion outlet orifice. In operation, the extrusion nozzles, having their outlet orifices above the conveyor belt, are positioned at an angle of from 60° towards the direction of movement of the conveyor belt to being parallel with the belt. The relative movements of the nozzle and the conveyor belt are such that a continuous, regularly wound strand is formed on the conveyor belt.

12 Claims, 5 Drawing Sheets

EXTRUSION APPARATUS

BACKGROUND OF THE INVENTION

This invention relates to the extrusion and decoration of pastry products.

The application of continuous extrusion to the manufacture of decorated food products, particularly pastry goods, bakery products, articles of confectionery or desserts, for example, ice creams, is known.

The conventional method comprises depositing a continuous strand of pastry material on a moving conveyor belt. The strand may then be manually decorated simply by applying continuous or non-continuous decorative elements. Alternatively, the decoration process may be mechanized, particularly for the application of continuous decorations, by means of extrusion attachments comprising fixed nozzles situated tangentially to the strand and designed, for example, to make a reciprocating movement in a plane parallel to the axis of the strand.

In another known method (U.S. Pat. Nos. 1,714,234 and 4,504,511), a decorated strand of pastry product is formed by means of a nozzle rotating about the axis of flow of the product, of which at least one of the outlet openings is eccentric in relation to the flow axis. The strand in the shape of a spiral or, where appropriate, cable is formed in the empty space at the nozzle exit by virtue of the non-uniform rotation of the eccentric outlet openings. It may be deposited on a moving conveyor belt which does not participate directly in its shaping. The machinery used to carry out this particular method has the advantage that the principal and auxiliary extrusion elements are accommodated in the same extrusion head.

The construction of a rotary extrusion head is relatively complicated. Seals between the moving parts and the fixed parts have to be provided in the nozzle itself together with a mechanism for driving the moving parts. The problem is aggravated where it is desired to obtain decorative strands of complex shape because their shape is imparted solely by the rotation of the nozzle about itself without participation of the surface on which the strands are deposited. Accordingly, a head of the type in question is cumbersome and difficult to clean.

SUMMARY OF EMBODIMENTS OF THE INVENTION

It has now been found that decorated strands of pastry products in the form of spirals or cables can be made by means of a simple, compact apparatus which is easy to clean.

The present invention relates to a process and apparatus for the extrusion and decoration of pastry products, in which a pastry product is delivered continuously to an extrusion nozzle through a flexible tube and a decorated strand of pastry material is formed on a continuously moving conveyor belt, characterized in that the nozzle is integral with a mobile support to which such a movement is transmitted that the support revolves in one plane and always keeps the same orientation in space, in that the nozzle is directed parallel to or is inclined at an angle of up to 60° towards the direction of movement of the conveyor belt, in that the outlet orifice of the nozzle describes a repetitive curved trajectory and in that the support and the conveyor belt cooperate to form a continuous, regularly wound strand on the conveyor belt.

The formation of the spiral is the consequence of the interaction between the strand leaving the nozzle and the conveyor belt. A large number of different decorative forms may be obtained by adjusting the various parameters, such as the speed at which the nozzle orifice describes the curved trajectory, the configuration of the trajectory, the extrusion rate, the distance and the inclination of the nozzle in relation to the belt and the speed of the belt.

The nozzle may be horizontal or may be inclined towards the direction of movement of the conveyor belt at an angle of up to 60°, preferably at an angle of from 20 to 60°, for example, at an angle of from 30 to 45°.

In the context of the invention, the expression "integral with the support" means that the nozzle generally is fixed to the mobile support. However, in certain cases, for example, when the strand is desired to have a spiral configuration even at its centre, the nozzle may also rotate about its axis. In that case, the movement by which the nozzle rotates about itself may advantageously be communicated to the nozzle by a rotary coupling which entrains the flexible tube upstream of the nozzle.

The outlet orifice may have any profile, for example, oval, circular, polygonal or star-shaped, and may be fluted, toothed or grooved. These profiles may be, for example, those of the piping nozzles commonly used by pastry cooks and confectioners.

In one preferred embodiment of the process, the outlet orifice describes a circle preferably having a radius of from 5 to 50 mm. The extrusion rate, the speed of movement of the nozzle and the rate of advance of the conveyor belt are of course interrelated. For example, for an outlet orifice approximately 40 mm in diameter, when the nozzle describes from 70 to 100 circles/minute, for a throughput of product of from 150 to 250 l/h, good results are obtained when the speed of the conveyor belt is approximately 3 m/minute.

When the nozzle rotates about its axis as indicated above and a circular movement is transmitted to the support, the direction in which the nozzle rotates about itself is preferably opposite to the direction of rotation of the support and, hence, of the outlet orifice. Good results are obtained for a rotation of the nozzle about itself of from 10 to 50 revolutions per minute and, more especially, about 30 revolutions per minute.

The distance of the outlet orifice of the nozzle in its low position from the conveyor belt is also an important factor. It is advantageously as small as possible when it is desired, for example, to obtain a strand of which the cross-section fits into a circle. Similarly, the diameter of the outlet orifice is proportional to the diameter of the circle which it describes and preferably corresponds to approximately half that diameter. If it is desired, for example, to obtain a strand of which the cross-section fits into an ellipse, the spiral may be flattened to a certain extent. The distance between the low position of the nozzle and the belt does not exceed 50 mm.

In another embodiment of the process, the trajectory of the outlet orifice of the nozzle reproduces a given trace by optical reading of a drawing on a contrasting background, for example in block on a white background, as will be explained hereinafter in conjunction with the detailed description of the apparatus.

In the practical application of the process, it is possible to use nozzles comprising several compartments for the co-extrusion of several strands of different type which may be coaxial (in superposed layers), joined or even separate.

It is possible to use a series of nozzles optionally aligned transversely or longitudinally in relation to the conveyor belt, preferably aligned transversely, and integral with one and the same support. The fact that the support is mobile and the nozzles fixed provides for considerable flexibility in terms of assembly because the nozzles have small overall dimensions limited in practice to the external diameter of the fixing collars and rings of the flexible tubes and the piping nozzles.

The process according to the invention enables decorated strands of various types and colours to be formed from any pastry material which, where appropriate, may contain solid ingredients. For example, it is possible to prepare bakery products, pastry goods, confectionery articles, particularly iced confectionery articles, or culinary dishes. These articles may be sections of the strand obtained by cutting.

For example, sections of ice cream may be hardened by freezing, where appropriate after the insertion of sticks. In the culinary field, it is possible, for example, to fry sections of deep-fried mashed potato and then to freeze them to produce decorated croquettes. Finally, it is possible to prepare complex articles of the gateau or decorated dish type incorporating the strands in question.

The apparatus for carrying out the process is characterized in that it comprises:

a continuously moving conveyor belt, a mobile support above the conveyor belt, an extrusion nozzle which is integral with the support and connected by a flexible tube to a source for the continuous supply of pastry product, the nozzle being directed parallel to or inclined at an angle of up to 60° towards the direction of movement of the conveyor belt, means for transmitting movement to the support so that it revolves in one plane and always keeps the same orientation in space and in such a way that the outlet orifice of the nozzle describes a repetitive curved trajectory and in that the support and the conveyor belt cooperate to form a continuous, regularly wound strand on the conveyor belt.

The invention is described in more detail in the following with reference to the accompanying drawings.

DESCRIPTION OF PREFERRED EMBODIMENTS

Figure 1:
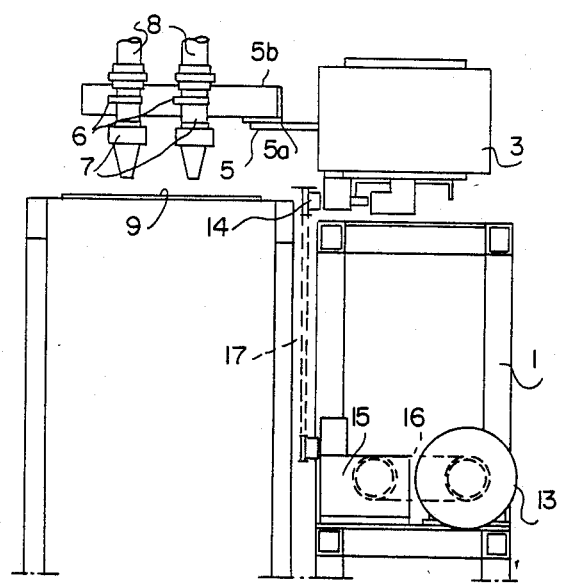
FIG. 1 is a diagrammatic view of the apparatus as a whole.
Figure 2:
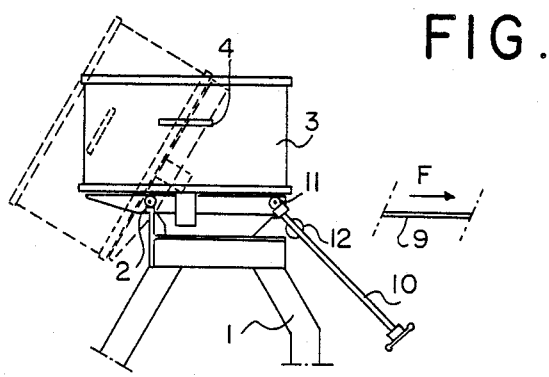
FIG. 2 is a diagrammatic view from the left in FIG. 1 of the housing accommodating the means for transmitting movement to the nozzle support.
Figure 3:
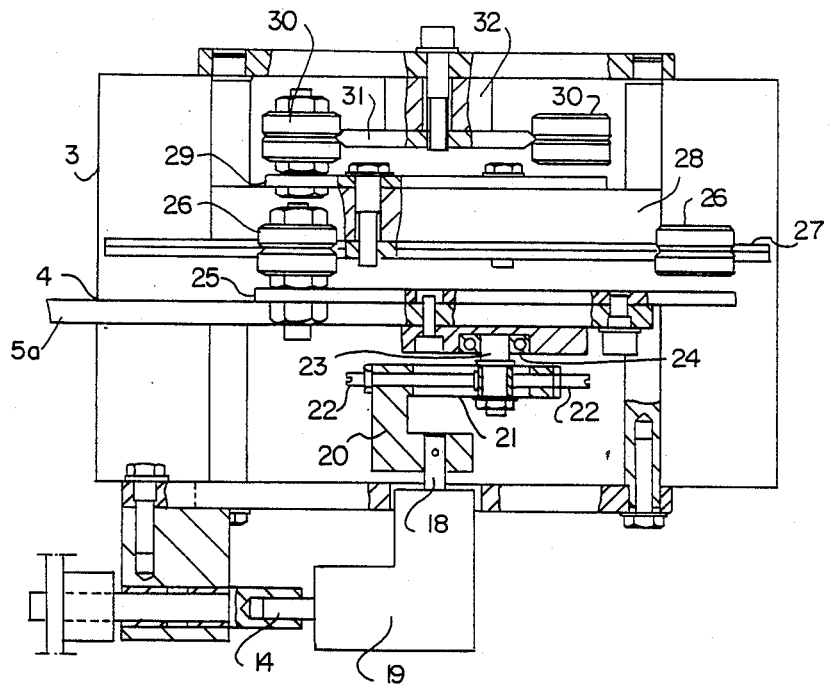
FIG. 3 is a view, partly in section, of the means for transmitting movement to the nozzle support.

In FIGS. 1, 2 and 3, the apparatus is shown in a rest position and not in the working position for reasons of clarity. A working position in which the housing is inclined at an angle of approximately 60°, corresponding to an angle of inclination of the nozzles of approximately 30° in relation to the horizontal, is shown in dotted lines in FIG. 2.

As shown in FIGS. 1 and 2, the apparatus comprises a frame 1 on which a housing 3 accommodating the drive mechanism described in detail hereinafter is mounted adjacent an edge of the conveyor belt to pivot about the axis 2. A slot 4 is formed in the housing 3 for the passage of the support 5 consisting of the plate 5a and the tube 5b fixed thereto.

Secured around the tube 5b are rings (not shown) integral with collars 6 which in turn secure the extrusion nozzles 7. These securing means enable the inclination of the nozzles to be adjusted. The flexible tubes 8 continuously supply the pastry mass to the nozzles 7 from which it is deposited on the conveyor belt 9 of which the direction of movement is indicated by the arrow F in FIG. 2. A screwthreaded rod 10 pivotally connected to the housing 3 about the axis 11 enables its inclination to be adjusted by screwing into the part 12 integral with the frame 1. At the same time, this adjusts the inclination of the support 5.

Naturally, when the flexible tubes 8 as indicated above cause the nozzles 7 to rotate about themselves, the collars 6 have to be replaced, for example, by orifices formed in the support 5 or by guide rings leaving a clearance for this rotation.

The motor 13 drives the shaft 14 through the variable transmission 15 and the chains 16 and 17.

As shown in FIG. 3, the shaft 14 transmits the rotational movement to the shaft 18 perpendicular thereto through the bevel gear 19. To the shaft 18 is fixed a crank 20 of which the lever 21 is adjustable by means of the screws 22 which bear against the gudgeon 23 which, before the screws 22 are tightened, is capable of sliding along a slot formed in the arm of the lever.

The gudgeon 23 engages in the bearing 24 mounted on ballbearings and forms the articulated eye of the crank. The bearing 24 is fixed to the plate 5a integral with the plate 25 which carries a first set of 4 rollers 26. The rollers 26 are designed to roll freely along the track 27 which enables the support 5 to be laterally displaced. To the track 27 is fixed a spacer block 28 to which in turn is fixed a plate 27 carrying a second set of rollers 30. The rollers 30 are designed to roll freely along the track 31 which is fixed to the housing 3 via the spacer block 32. The fixed track 31 is perpendicular to the displaceable track 27 which enables the support 5 to be longitudinally displaced.

In the embodiment described above, the movement transmitted to the support 5 is circular. It is obvious that, with a simple adaptation, the gudgeon 23 could follow a cam, for example, of elliptical shape, fixed to the housing 3, assuming, for example, that it could slide in the lever 21, that it is where appropriate returned towards the shaft 18 by a spring and that its lower part rolls in the cam in question by way of a roller.

Figure 4A:
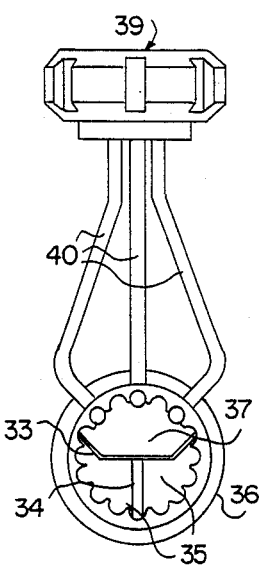
FIG. 4 is a partial front view (4a) of and a longitudinal section (4b) through a particular type of nozzle.
Figure 4B:
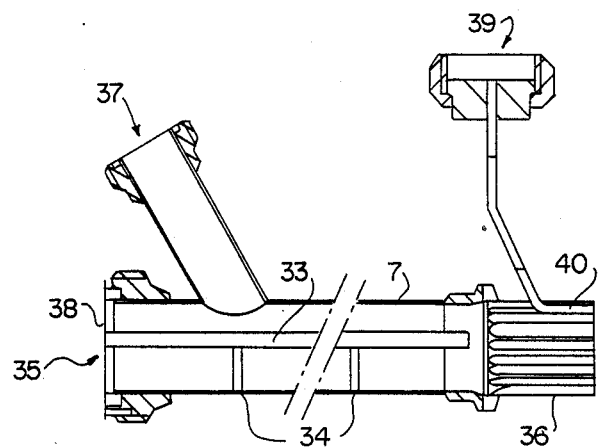
Figure 7:
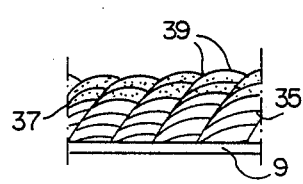
FIG. 7 shows a strand obtained with the nozzle shown in FIG. 4.

As shown in FIG. 4, (4a, 4b), the body of a nozzle 7 is divided by an internal partition 33 in the form of a removable trough which rests on the bottom of the nozzle 7 through feet 34. A first pastry mass 35, for example, of ice cream, arrives through the lower compartment in the fluted piping nozzle 36. A second pastry mass 37, for example, of ice cream, of different colour and perfume is delivered through the lateral pipe into the upper compartment towards the piping nozzle 36. A plate 38, of which the upper part is solid and which is provided with an opening corresponding to the cross-section of the lower compartment prevents the two pastry masses 35 and 37 from mixing with one another before arriving at the piping nozzle 36. At this point, they combine to form a complex strand. A third pastry mass 39, for example, fruit or caramel syrup, arrives at the piping nozzle 36 through fine tubes 40 (of which only one has been shown in FIG. 4b in the interests of clarity) accommodated in the flutes. By means of this nozzle, it is possible to prepare a decorated strand of very attractive appearance as shown in FIG. 7.

Figure 5:
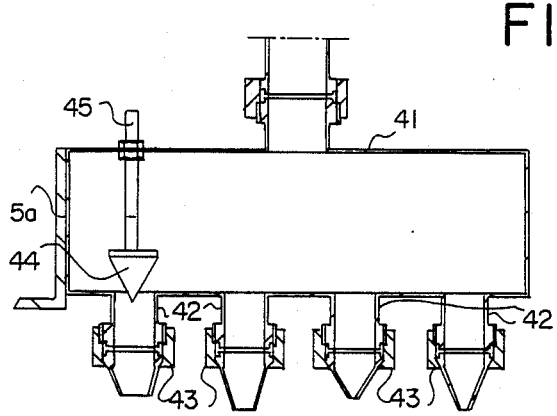
FIG. 5 is a section through a series of nozzles of a second type.

As shown in FIG. 5, a single flexible tube carries a pastry mass towards a parallelepipedic chamber 41 comprising four extrusion tubes 42 of which the ends are screw-threaded. The chamber 41 is fixed to the plate 5a and the assembly 41, 5a forms the support 5. Decoration piping nozzles of the type commonly used by pastry cooks are fixed to the ends of the tubes 42 by means of rings 43. Disposed opposite each tube 42 inside the chamber 41 are cones 44 by means of which the supply to each piping nozzle may be individually regulated through the screws 45 (only one of these cones has been shown).

Figure 6:
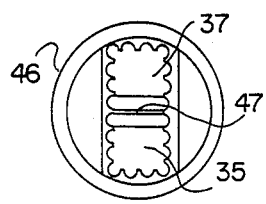
FIG. 6 is a partial front view of a nozzle of a third type.
Figure 8:
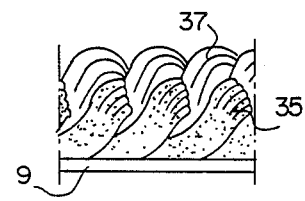
FIG. 8 shows a strand obtained with the nozzle shown in FIG. 6.

As shown in FIG. 6, the extrusion sleeve 46 may be fitted to a nozzle of the type shown in FIG. 4b, but with the piping nozzle 36 removed. Two different pastry masses 35, 37, for example, of ice cream, are extruded in the form of two fluted strands of which the cross-section fits into a square and which are separated by the part 47 which may be removable and which extends substantially to the end of the extrusion sleeve by pivoting the extrusion sleeve through 45° in relation to the position illustrated in FIG. 6 and by keeping it at 45° during extrusion, a "cable effect" decorated strand as shown in FIG. 8 is obtained.

Figure 9:
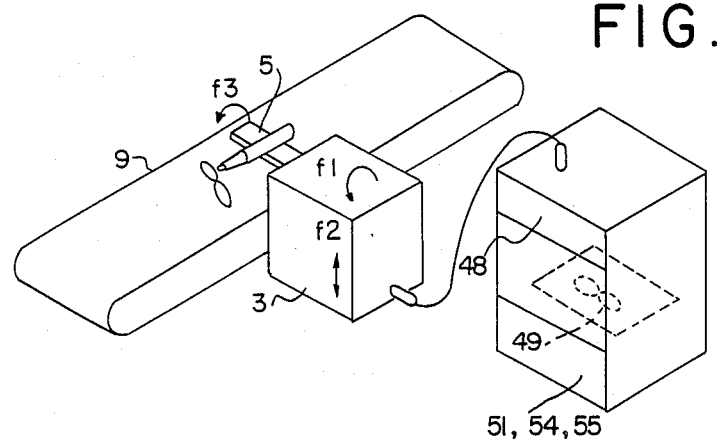
FIG. 9 diagrammatically illustrates the principle of an automated variant of the apparatus comprising means for transmitting movement to the nozzle support by optical reading.

As shown in FIG. 9, the transmission mechanism is controlled by a unit for reading a drawing which is connected to a unit for processing the image produced which itself is connected to a control unit for imparting to the nozzle support 5 a movement which reproduces the trace of the drawing. The housing 3 accommodates the transmission mechanism described in detail hereinafter with reference to FIG. 10. The housing 3 is adjustable in rotation (arrow $f_1$) and in height (arrow $f_2$). The nozzle support 5 is variable in its inclination (arrow $f_3$).

Figure 10:
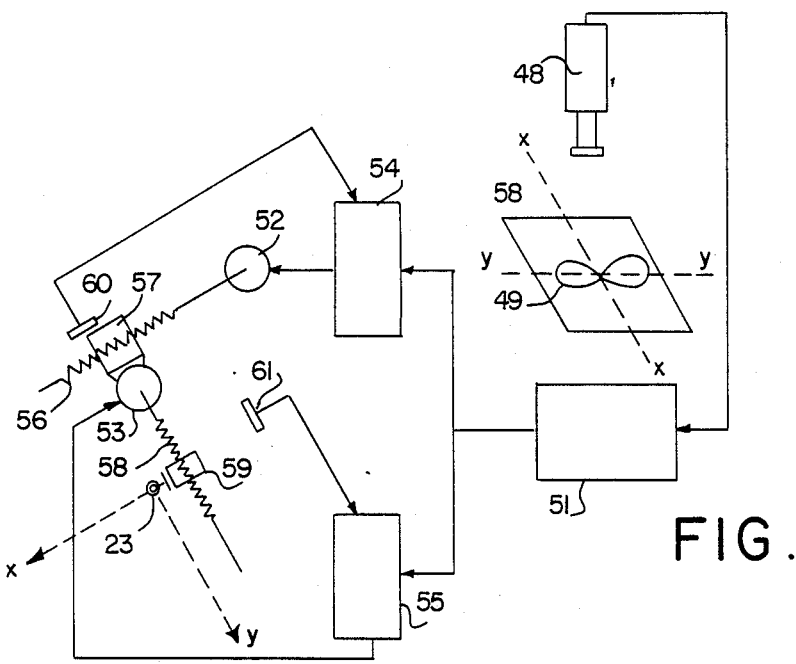
FIG. 10 diagrammatically illustrates the means for transmitting movement in the variant shown in FIG. 9.

As shown in FIG. 10, a camera 48 reads a trace 49 in black on a white support 50. The image is transmitted to the processing unit of a computer 51 which analyzes it point-by-point in relation to two axes XX and YY. This information is used to drive two low-inertia motors 52 and 53 through two control elements 54 and 55. The motor 52 turns an endless screw 56 which engages in the thread of a nut 57, enabling it to be displaced in both directions along the axis XX. To the nut 57 is fixed the motor 53 which turns an endless screw 58 perpendicular to the screw 56. The screw 58 engages in the thread of a nut 59, enabling it to be displaced in both directions along the axis YY. The sensor 60 monitors the value of the position of the nut 57 and transmits the information to the control element 54 where it is compared with the analyzed value of the co-ordinate x. Similarly, the sensor 61 monitors the value of the position of the nut 59 and transmits to the control element 55 the information concerning the co-ordinate y. The nut 59 thus receives a combined movement of which the resultant is a displacement along the trace 49. This movement is transmitted to the nozzle support, for example through a gudgeon, such as the gudgeon 23 in FIG. 3, fixed to the nut 59. This gudgeon in turn entrains the displaceable assembly consisting of the plates 5a, 25, the tracks 27 and 31 and the rollers 26 and 30, as described above in reference to FIG. 3. Thus, the nozzle support revolves in one plane following the trace 49, the longitudinal and lateral components of its movement being x and y, respectively.

We claim:

1. An apparatus for preparing decorative pastry products comprising:
   a conveyor belt for providing a surface to be advanced and to accept deposit of extruded pastry material;
   a mobile support disposed above the surface of the conveyor belt to be advanced extending transversely with respect to a direction of movement in which the surface of the conveyor belt is to be advanced;
   at least one extrusion nozzle and means associated with each extrusion nozzle for securing each extrusion nozzle to the mobile support, each extrusion nozzle terminating in an extrusion nozzle outlet orifice positioned above the surface of the conveyor belt to be advanced and each securing means providing for inclining and adjusting the inclination of each extrusion nozzle, in operation, from being parallel with to being inclined at an angle of up to 60° towards and in the direction in which the surface of the conveyor belt is to be advanced;
   at least one source for providing a supply of pastry product to each extrusion nozzle for extrusion from each extrusion nozzle outlet orifice onto the surface of the conveyor belt to be advanced; and
   means adjacent an edge of the conveyor belt for transmitting movement to the mobile support for revolving the mobile support in one plane while keeping the mobile support in the same orientation in space for providing each extrusion nozzle outlet orifice with a repetitive curved trajectory for, in cooperation with advancing movement of the surface of the conveyor belt to be advanced, forming a continuous wound strand of pastry material.

2. An apparatus according to claim 1 wherein the support and each extrusion nozzle are variable in direction, in inclination and in height in relation to the conveyor belt.

3. An apparatus according to claim 1 wherein each extrusion nozzle is constructed for delivering products of different types.

4. An apparatus according to claim 3 wherein each extrusion nozzle is partitioned.

5. An apparatus according to claim 1 wherein each extrusion nozzle outlet orifice is shaped to have an oval, circular, polygonal, or star-shaped profile.

6. An apparatus according to claim 1 wherein each extrusion nozzle outlet orifice is fluted, toothed, or grooved.

7. An apparatus according to claim 1 wherein the means for transmitting movement to the mobile support includes a displaceable track, a first set of rollers integral with the mobile support for sliding on the displaceable track, a fixed track perpendicular to the displaceable track, a second set of rollers integral with the displaceable track for sliding the displaceable track on the fixed track and a crank which is pivotally connected to the mobile support by an adjustable lever and which is connected to a drive shaft which is connected to a motor.

8. An apparatus according to claim 1 or 7 wherein each extrusion nozzle is rotatable about an axis for imparting rotary motion to each extrusion nozzle outlet orifice.

9. An apparatus according to claim 1 or 7 wherein the means for transmitting movement to the mobile support includes a unit for reading an image of a drawing, a unit for processing the image read and a control unit for imparting movement to the mobile support and each extrusion nozzle for forming a strand reproducing a trace of the drawing based on the image processed.

10. An apparatus according to claim 9 wherein each extrusion nozzle is rotatable about an axis for imparting rotary motion to each extrusion nozzle outlet orifice.

11. An apparatus according to claim 9 wherein the control unit includes a first control element for driving a first motor for turning a first endless screw for engaging the screw in a screwthread of a first nut and for displacing the nut in both directions along an axis XX and a second control element for driving a second motor fixed to the first nut for turning a second endless screw which is perpendicular to the first endless screw for engaging a screwthread of a second nut and displacing the second nut in both directions along an axis YY perpendicular to the axis XX, and wherein the positions of the first and second nuts are monitored by sensors connected to the respective control elements for providing information to the control elements and wherein the movement of the second nut is transmitted to the rollers and tracks and mobile support and each extrusion nozzle for reproducing the trace of the drawing.

12. An apparatus according to claim 11 wherein each extrusion nozzle is rotatable about an axis for imparting rotary motion to each extrusion nozzle outlet orifice.

* * * * *

UNITED STATES PATENT AND TRADEMARK OFFICE
CERTIFICATE OF CORRECTION

PATENT NO. : 4,913,645

DATED : April 3, 1990

INVENTOR(S) : Alain DAOUSE, et al.

It is certified that error appears in the above-identified patent and that said Letters Patent is hereby corrected as shown below:

Column 1, in each of lines 7, 13, 24, 52, 56, 57, and 59, "pastry" should be --pasty--.

Column 3, in each of lines 15 and 35, "pastry" should be --pasty-.

Column 4, line 26, "pastry" should be --pasty--.

Column 5, in each of lines 4, 6, 13, 15, 23, and 36, "pastry" should be --pasty--.

Column 6, in each of lines 19, 22, and 41, (lines 1, 4, and 22 of claim 1), "pastry" should be --pasty--.

Signed and Sealed this

Twenty-fifth Day of June, 1991

Attest:

HARRY F. MANBECK, JR.

*Attesting Officer*   *Commissioner of Patents and Trademarks*